Sept. 29, 1970  W. W. HIGGINBOTHAM  3,530,737
COLLAPSIBLE STEERING COLUMN

Filed Aug. 21, 1968  2 Sheets-Sheet 1

INVENTOR.
William W. Higginbotham
BY
Harness, Dickey & Pierce
ATTORNEYS.

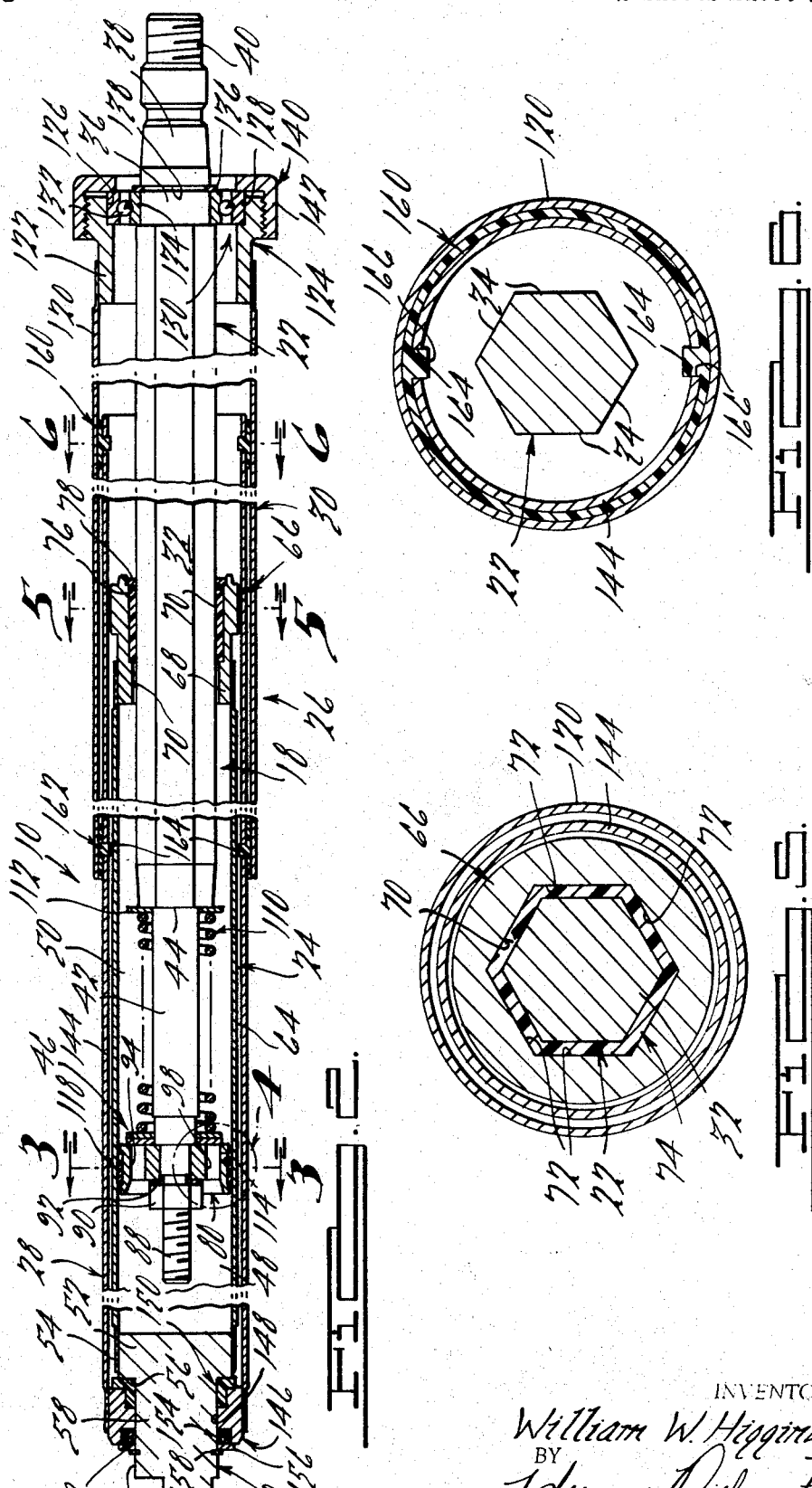

3,530,737
COLLAPSIBLE STEERING COLUMN
William W. Higginbotham, Monroe, Mich., assignor to Monroe Auto Equipment Co., Monroe, Mich., a corporation of Michigan
Filed Aug. 21, 1968, Ser. No. 754,172
Int. Cl. B62d 1/16
U.S. Cl. 74—492      17 Claims

ABSTRACT OF THE DISCLOSURE

A collapsible steering column comprising a steering shaft having upper and lower shaft sections, the upper shaft section adapted to be operatively connected to an associated steering wheel and the lower shaft section adapter to be operatively connected to an associated steering gear assembly; means operatively connecting the upper and lower shaft sections and defining a fluid reservoir; valve means disposed within the reservoir and dividing the interior thereof into first and second fluid chambers, the valve means normally being closed and being actuatable to an open position in response to preselected axial movement of one of the steering shaft sections, whereby to permit actuating fluid disposed in one of the chambers to flow into the other of said chambers and thereby dampen the axial movement of the one steering shaft section, and a telescopic jacket or housing surrounding the steering column and comprising upper and lower sections telescopically movable relative to one another upon relative axial movement of the steering shaft sections.

BACKGROUND OF THE INVENTION

It has long been recognized that one of the greatest dangers in automobile collisions is the likelihood of serious chest and similar bodily injury to the driver resulting when the driver's momentum hurls him suddenly against the rigid and non-yielding conventional steering column and wheel assembly. Such injuries are primarily due to the secondary collision which occurs milliseconds after the vehicle has been brought substantially or completely to a halt, wherein the driver's body is still in motion and comes crashing forward into engagement with the steering wheel and support columns therefor. Such injuries are also due in part to the tendency of the steering shaft to move rearwardly toward the driver during the primary collision.

While a myriad of proposals have heretofore been made to reduce the danger of the aforesaid injuries, most of all of such proposals have proven unsatisfactory for one reason or another. For example it has heretofore been proposed to place an axially compressible or collapsible tube between the upper and lower ends of a vehicle steering column which, upon impact resulting from a reduced collision, would be compressed and thereby decelerate the driver's body and minimize injury to the driver. Although such a design has been proven to be effective from the standpoint of reducing driver injuries during front-end and similar type automobile collisions, such designs have been objectionable from the standpoint that the compressible tube is destroyed upon even moderate impacts, thereby rendering the steering column inoperative. Moreover, such designs cannnot be tested for proper functioning prior to assembly without being destroyed, and thus it has been difficult to maintain uniform manufacturing and performance characteristics.

The present invention provides a new and improved collapsible steering column design which obviates the aforementioned and other objectionable features inherent in steering columns of the above described character which incorporate "mechanical" interconnections between the upper and lower sections of a steering column. Generally speaking, the present invention provides a new and improved collapsible steering column construction which utilizes a fluid medium as a shock and energy abosrbing means, instead of the heretofore known and used mechanical energy absorbing columns.

While various collapsible steering columns which utilize a fluid shock absorbing medium are known in the prior art, the present invention aims at a simplification, with respect to the manufacture, assembly and operation, of herefore known and used prior art constructions. By way of example, in one collapsible steering column construction of the prior art, Pat. No. 2,922,316, issued to Schmid Jan. 26, 1960, the steering column is guided in a hollow worm steering gear which is in turn provided with a plurality of apertures or bores disposed one behind the other, with the bores acting as valve means as the steering column undergoes an axial or longitudinal displacement. Another example of the prior art is shown in Pat. No. 3,058,367, issued to Hoffman Oct. 16, 1962, which discloses a tapered piston adapted to be received within a uniform size bore upon collapse of the steering column. The bore is filled with a suitable hydraulic fluid which is expelled in a preselected manner so as to dampen axial movement of the steering column and hence absorbs the energy of the driver's impact with the steering wheel assembly.

All of the heretofore known and used prior art collapsible steering column designs utilizing a hydraulic or similar type shock and energy absorbing medium, including the designs shown in the above United States patents have been found to be objectionable from the standpoint that relatively complicated and expensive fluid seals, joints and precision machined component parts are necessary for effective operation thereof. Moreover, such prior art designs do not readily lend themselves to the mass production techniques practiced in the modern automobile industries.

Generally speaking, the collapsible steering column of the present invention comprises an elongated cylindrical housing having upper and lower sections which are telescopically engaged with one another and are thereby adapted to move axially or longitudinally upon impact of the driver with the associated steering wheel assembly. Disposed interiorly of the housing is a steering shaft comprising longitudinal spaced upper and lower shaft sections and a generally cylindrically shaped fluid reservoir disposed interjacent and operatively connecting the shaft sections. The upper end of the reservoir is longitudinally slidably, but non-rotatably connected to the lower end of the upper stering shaft section. A fluid valve assembly is mounted on the lower end of the upper shaft section and divides the interior of the reservoir into a pair of fluid chambers. The valve assembly is adapted to function in selectively controlling the flow of hydraulic fluid within the reservoir from one of the aforesaid chambers into the other of said chambers upon axail movement of one of the steering shaft sections with respect to the other and thereby absorbed the shock and energy of the vehicle driver's momentum so as to minimize injury of the driver in the event of a vehicle collision.

A particular feature of the collapsible steering column of the present invention resides in the fact that the assembly may be extended and used again after it has once been collapsed without requiring the replacement of any component parts thereof. Also, the unit can be tested prior to assembly within the associated vehicle in order to determine the operational characteristics thereof, which is not possible with mechanical type systems heretofore known and used. An additional feature of the present invention resides in the fact that the operation of the valve assembly embodied therein may be selectively adjusted to control the impact force required to effect collapsing of the assembly. Furthermore, the steering column assembly of the present invention will be found to be of an extremely simple design and thus may be easily assembled and economically manufactured.

SUMMARY OF THE INVENTION

This invention relates generally to steering columns for automotive and similar type vehicles, and more particularly, to a new and improved collapsible steering column.

It is, accordingly, a general object of the present invention to provide a new and improved vehicle steering column adapted to collapse axially thereof under the influence of an axially directed force exerted thereagainst.

It is a more particular object of the present invention to provide a collapsible steering column incorporating a hydraulic fluid type shock absorbing mechanism therewithin.

It is another object of the present invention to provide a new and improved collapsible steering column which may be conveniently reset or extended to its original condition or length after being collapsed.

It is another object of the present invention to provide a new and improved collapsible steering column which is of an extremely simple design, is easy to assemble and economical to commercially manufacture.

It is yet another object of the present invention to provide a collapsible steering column of the above described type which may be axially or longitudinally adjusted to selectively position an associated steering wheel assembly so as to accommodate different vehicle operators.

It is a further object of the present invention to provide a collapsible steering column which may be tested prior to assembly in order to determine the operational characteristics thereof.

It is another object of the present invention to provide a collapsible steeering column incorporating a valve assembly which may be selectively adjusted to control the impact force required to effect collapsing thereof.

Other objects and advantages of the present invention will become apparent from the following detailed description taken in conjunction with the accompanying drawings.

BRIEF DESCRIPTION OF THE DRAWINGS

FIG. 2 is a longitudinal cross-sectional view, partially broken away, of the steering column illustrated in FIG. 1;

FIG. 5 is a transverse cross-sectional view taken substantially along the line 5—5 of FIG. 2, and FIG. 6 is a transverse cross-sectional view taken substantially along the line 6—6 of FIG. 2.

DETAILED DESCRIPTION OF A PREFERRED EMBODIMENT

For purposes of description, the terms "inwardly," "outwardly" and derivatives thereof will have reference to the geometric center of the steering column assembly of the present invention and the various component parts thereof. Likewise, the terms "forwardly," "rearwardly" and words of similar import will have reference to the front and rear ends of the assembly of the present invention, with the forward end thereof being located at the left sides of FIGS. 1 and 2.

Figure 1:
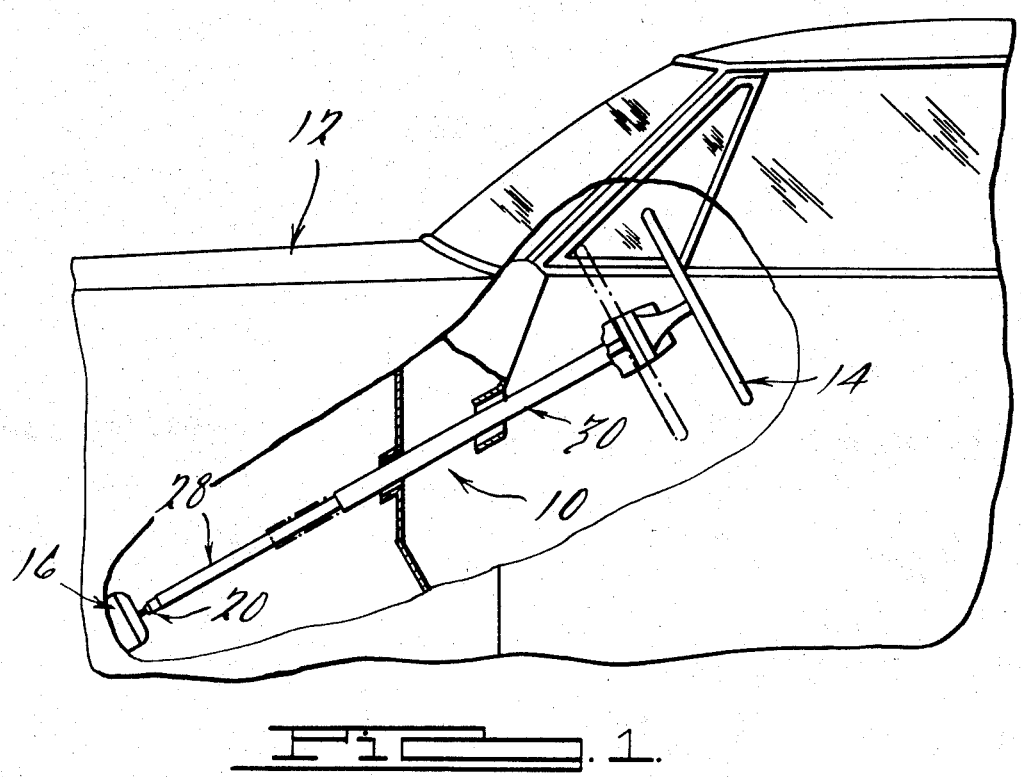
FIG. 1 is a fragmentary side elevational view, partially broken away, of a typical automotive vehicle having a collapsible steering column in accordance with a preferred embodiment of the present invention.

Referring now in detail to FIG. 1 of the drawings, a collapsible steering column assembly 10, in accordance with a preferred embodiment of the present invention, is shown in operative association with a conventional automotive vehicle 12 having a steering wheel assembly 14 and a steering gear box 16. As will hereinafter be described in detail, the assembly 10 is adapted to operatively connect the steering wheel 14 with the gear box 16, and is constructed so as to be collapsible upon impact of the vehicle operator or driver with the steering wheel assembly 14 in a manner so as to decelerate the forward movement of the driver's body and minimize rearward movement of the associated steering shaft, thereby minimizing injury to the driver during both the primary and secondary stages of a collision of the vehicle 12.

Generally speaking, the steering column assembly 10 comprises an elongated steering shaft 18 consisting of a forward shaft section 20 and a rearward shaft section 22 which are coaxially aligned and are adapted to be operatively connected to the gear box 16 and steering wheel assembly 14, respectively. The assembly 10 further comprises an elongated, generally tubular or cylindrical shaped fluid reservoir 24 which, together with the shaft sections 20 and 22, is enclosed within a generally cylindrical shaped exterior jacket or housing 26 comprising a forward housing section 28 and a rearward housing section 30. As will later be described, the housing sections 28, 30 are telescopically engaged with one another and are thereby adapted to move axially relative to each other at such time as the assembly 10 is collapsed as, for example, from the solid line position shown in FIG. 1 to the phantom line position shown in this figure.

Referring now in detail to the shaft section 22, as best illustrated in FIG. 2, the section 22 is formed with a longitudinally extending intermediate portion 32 which is polygonal, preferably hexagonal in cross section and defines a plurality of longitudinal coextensive face portions or facets 34. The rearward end of the shaft section 22 is formed with an annular shoulder 36 which is slightly smaller in cross section than the intermediate portion 32 and is adapted to be rotatably supported within the adjacent end of the housing 26 in a manner later to be described. The extreme rearward end of the shaft section 22 is formed with a generally rearwardly tapered portion 38 and an externally threaded end portion 40 which are adapted to receive and support the steering wheel assembly 14 in a manner well known in the art.

The forward end of the shaft section 22 is formed with a reduced diameter, generally cylindrical shaped portion 42 which defines an annular shoulder 44 with the intermediate portion 32 and is adapted to function in a manner later to be described in supporting a fluid actuatable valve assembly, generally designated 46, that is disposed interiorly of the reservoir 24 and separates the interior thereof into forward and rearward fluid chambers 48 and 50, respectively.

The forward shaft section 22 of the steering shaft 18 comprises a rearwardly extending, generally cylindrical shaped mounting portion 52 which defines an annular side wall 54 terminating at its forward end in a generally radially inwardly extending wall 56. The radially innermost portion of the wall 56 terminates at a forwardly extending, generally cylindrical shaped portion 58 having a cylindrical outer periphery 60 and including a forwardly extending connecting portion 62 integral thereon. The connecting portion 62 is adapted to function in a conventional manner in operatively connecting the steering shaft 18 to the associated gear box assembly 16, whereby rotational steering movement of the wheel assembly 14 will be transmitted through the shaft 18 to effect preselected actuation of the assembly 16 and hence proper turning movement of the associated wheels of the automotive vehicle 12.

As best illustrated in FIG. 2, the fluid reservoir 24 comprises an annular or cylindrical side wall member 64 which is arranged coaxially of the rearward shaft section 22 and is spaced radially outwardly therefrom and radially inwardly from the forward housing section 28. The forward end of the wall member 64 is adapted to be fixedly secured, as by welding or the like, to the wall 54 of the shaft section 20, in a manner such that the cylindrical portion 52 of the shaft section 22 provides a fluid tight closure means at the forward end of the reservoir 24.

The rearward end of the reservoir 24 is provided with an annular guide member 66 which has a generally cylindrical shaped forwardly extending section 68 adapted to be received within the rearward end of the side wall 64 and be fixedly secured thereto such that a fluid tight seal is provided at the juncture of the guide member 66 and side wall 64. As best illustrated in FIG. 5, the guide member 66 is formed with a central opening 70 which is complementary in shape to the cross-sectional shape of the intermediate portion 32 of the shaft section 22, i.e., polygonal, preferably hexagonal, whereby the opening 70 defines a plurality of side edges, generally desginated 72, each of which corresponds with one of the facets 34 of the shaft section 22. Upon assembly of the steering column 10 of the present invention, the intermediate portion 32 of the shaft section 22 extends or projects through the opening 70, with a generally hexagonal shaped antifriction sleeve member 74 preferably being provided between the inner periphery of the opening 70 and the outer periphery of the shaft portion 32. The member 74 is preferably fabricated of Teflon or a similar material and is adapted to be maintained under a state of compression between the periphery of the opening 70 and shaft portion 32. The sleeve member 74 is adapted to prevent metal-to-metal contact between the shaft section 22 and guide member 66 and also functions to absorb or "take-up" any lash which may be produced upon rotational movement of the steering shaft 18 relative to the fluid reservoir 24. In order to provide a fluid tight seal between the outer periphery of the shaft portion 32 and the guide member 66, a suitable O-ring sealing member or the like 76 is preferably provided adjacent the rearward end of the bearing member 74 and is retained within the guide member 66 by means of a suitable snap ring or the like 78. It will be seen from the above construction that the rearward shaft section 22 will be free to slide longitudinally of the guide member 66 and hence longitudinally of the entire fluid reservoir 24; however, by virtue of the complementary hexagonal configuration of the shaft portion 32 and opening 70, relative rotation between the shaft section 22 and reservoir 24 is precluded, with the result that rotation of the shaft section 22 will cause the entire reservoir 24 to rotate, thereby rotating the forward steering shaft section 20 which is secured to the forward end of the reservoir 24. Therefore, it will be seen that the reservoir 24 connects the forward and rearward shaft sections 20 and 22 such that rotation of the steering wheel assembly 14 will result in corresponding rotation of the forward shaft section 20 and hence proper actuation of the steering gear box assembly 16, and that the rearward shaft section 22 is adapted to slide axially or longitudinally of the reservoir 24 in the event a force of a predetermined magnitude is exerted against the steering wheel assembly 14, such as would occur when the vehicle 12 is involved in a collision.

Figures 3, 4:
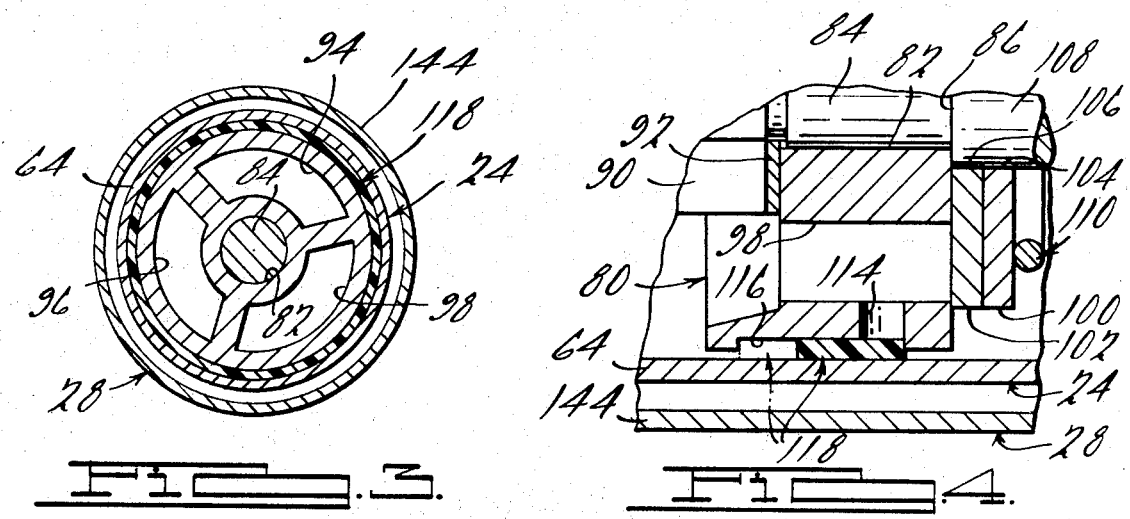
FIG. 3 is a transverse cross-sectional view taken substantially along the line 3—3 of FIG. 2.
FIG. 4 is an enlarged fragmentary view of the portion of the steering column within the circle of FIG. 2.

Referring now in detail to the construction and operation of the valve assembly 46, as best seen in FIGS. 2 through 4, the assembly 46 comprises an annular generally disk-shaped valve member 80 which is formed with a central annular opening 82 adapted to receive a generally cylindrical shaped mounting portion 84 on the forward end of the steering shaft section 22. The mounting portion 84 terminates at the rearward end thereof at a generally annular, radially outwardly extending shoulder 86 against which the valve member 80 is adapted to be juxtapositioned. The forwardmost end of the shaft section 22 is formed with an externally threaded end portion 88 which is adapted to threadably receive a suitable lock nut 90 and washer 92 which function, together with the shoulder 86, in operatively securing the valve member 80 in the position illustrated in FIG. 2.

As shown in FIG. 3, the valve member 80 is formed with a plurality of generally arcuate shaped, circumferentially extending fluid ports 94, 96 and 98 which are adapted to provide for the maximum flow of hydraulic fluid from the fluid chamber 48 to the chamber 50 without impairing the structural integrity of the valve member 80. It will be apparent, of course, that the size and shape of the ports 94–98 may be varied with different applications so as to provide the desired fluid flow therethrough. The ports 94–98 are adapted to be normally closed by a pair of generally flat, ring-shaped closure members 100 and 102 which are formed with central openings 104 and 106, respectively, and are longitudinally slidably disposed on a generally cylindrically shaped portion 108 formed on the shaft section 22 directly rearwardly of the mounting portion 84. The closure members 100, 102 are adapted to be resiliently urged toward the rearward side of the valve member 80 by means of a helical coil spring 110 which extends coaxially of the shaft section 22 and abuts at the forward end thereof against the closure member 100 and at the rearward end thereof against a suitable washer or the like 112 disposed against the shoulder 44 of the shaft section 22. In operation, the fluid chamber 48 is adapted to be filled with a preselected volume of suitable hydraulic fluid which functions to resist forward movement of the valve assembly 46 and the rearward shaft section 22, as well as the steering wheel assembly 14 mounted thereon. In the event the operator of the vehicle 12 is involved in a collison or the like and is thrown against the steering wheel assembly 14, the shaft section 22 will be forced in a forwardly direction relative to the fluid reservoir 24 and against the resistance of the hydraulic fluid within the chamber 48. As the shaft section 22 thus moves forwardly, the fluid within the chamber 48 will bias the valve closure members 100, 102 away from the rearward side of the valve member 80 and against the resistance of the coil spring 110, whereby the fluid within the chamber 48 will flow through the ports 94–98 into the chamber 50. As the hydraulic fluid is thus released from the chamber 48, the force or energy of the vehicle operator in biasing the steering wheel assembly 14 and shaft section 22 in a forwardly direction will be absorbed or dampened, thus minimizing injury to the operator. It will be apparent, of course, that the force required to effect opening of the members 100, 102 will be controlled by the coil spring 110, and it has been found that a spring force of between 150 and 300 pounds is preferable in maintaining the valve members 100, 102 closed. Of course, the spring force of the spring 110 will vary with the relative angle at which the steering column 10 is mounted within the associated vehicle 12 since this angle is directly correlated to the reaction force experienced by the vehicle operator as he impinges against the steering wheel assembly 14. It will be noted that the relative axial position of the valve member 80 may be adjusted axially of the steering shaft section 22 by proper adjustment of the nut 90, whereby to selectively control the impact force required to effect opening and closing of the valve member 80.

As best seen in FIG. 4, the valve member 80 is preferably formed with one or more radially outwardly extending openings, one of which is shown herein and designated by the numeral 114. The opening(s) 114 communicates the interior of the adjacent port 94, 96 or 98 with the outer periphery of the valve member 80 which is spaced radially inwardly from the periphery of the side wall 64 and is formed with an annular recess 116 which extends therearound. The opening(s) 114 is adapted to be selectively closed by an annular band or sleeve member 118 which extends around the valve member 80 and is nestingly received within the recess 116 thereof. As shown in FIG. 4, the axial or longitudinal length of the sleeve member 118 is smaller than the axial length of the recess 116, whereby the sleeve member 118 is free to slide axially of the valve member 80 to the extent determined by the longitudinally spaced ends of the recess 116. It will be seen that when the sleeve member 118 is disposed at the rearwardmost extremity of the recess 116, i.e., in the position illustrated in FIG. 4, the sleeve member 118 functions to close the opening 114; however, when the member 118 is disposed at the forwardmost extremity of the recess 116, i.e., in the position identified by the phantom lead line in FIG. 4, the radially outermost end of the opening 114 is open, thereby communicating the associated port with the fluid chamber 50, with the result that the fluid chambers 48 and 50 are communicable with one another. In a preferred construction of the present invention, the sleeve member 118 is fabricated of Teflon or similar low frictional material and is thus adapted to slide freely between the solid line and phantom positions shown in FIG. 4. In operation of the steering column assembly 10, the hydraulic fluid which is normally disposed within the fluid chamber 48 forces the sleeve member 118 rearwardly of the valve member 80 to the solid line position shown in FIG. 4, whereby the opening 114 is closed to prevent fluid from flowing from the chamber 48 to the chamber 50 therethrough; however, in the event the steering column assembly 10 is collapsed, in which case the hydraulic fluid in the chamber 48 is communicated through the ports 94, 98 to the chamber 50, the pressure of the fluid in chamber 50 will exceed the pressure of the fluid in chamber 48, whereby the sleeve member 118 will be biased to the phantom line position shown in FIG. 4, thereby providing access to the opening 114 from within the chamber 50. Once the component parts of the assembly 10 are disposed in their normal position, the pressure of the hydraulic fluid within the chamber 48 exceeds the pressure in chamber 50, the sleeve member 118 will be biased rearwardly of the valve member 80 to its original solid line position shown in FIG. 4, thereby blocking or closing the opening 114. The function of the sleeve member 118 and opening 114 is essentially this; once the assembly 10 becomes collapsed, and is in no material way damaged, as might occur in the event of a minor collision the steering wheel assembly 14 and shaft section 22 may be reextended from the phantom line position shown in FIG. 1 to the solid line position. Such a feature is provided by the fact that when the assembly 10 is in a collapsed condition, the hydraulic fluid within the reservoir 24 will be primarily disposed within the fluid chamber 50, with the result that the differential fluid pressure between the chambers 48 and 50 will be such that the pressure in the chamber 50 exceeds the pressure in the chamber 48. As previously stated, when this condition exists, the sleeve member 118 is disposed in the phantom position in FIG. 4, whereby to communicate the chambers 48 and 50 through the opening 114 and associated valve ports 94, 96 or 98. Accordingly, the steering shaft section 22 may be biased axially rearwardly since the fluid within the chamber 50 is free to pass through the opening 114 and valve ports into the fluid chamber 48 until such time as the steering shaft 18 is properly positioned. Therefore, one particular feature of the present invention will be seen to reside in the fact that the assembly 10 may be successively reset or reextended after being collapsed under the influence of an undamaging impact since there are no mechanical parts thereof that will become damaged or destroyed during collapsing of the assembly 10.

Referring now to the housing 26, as best seen in FIG. 2, the rearward housing section 30 comprises a cylindrical side wall 120 which is arranged coaxially of the steering shaft 18 and is spaced radially outwardly therefrom. The rearward end of the wall 120 is adapted to be fixedly secured, as by welding, to the outer periphery of the forward end portion 122 of an annunlar collar member, generally designated 124. The rearward end of the collar member 124 is formed with an annular internal recess 126 which is adapted to receive and support the outer race 128 of an anti-friction bearing assembly, generally designated 130. The assembly 130 comprises a plurality of anti-friction bearings 132 and an inner race 134 which is supported on the shoulder 36 of the shaft section 22 and retained thereon by means of a suitable snap ring or the like 136 received within an annular recess 138, with the result that the rearward end of the shaft section 22 is rotatably supported within the rearward end of he housing section 30. A generally cup-shaped end cap member 140 having a forwardly extending annular internally threaded flange portion 142, is threadably received upon the rearward end of the collar member 124, whereby to retain the outer race 128 of the bearing assembly 130 in the operative position illustrated in FIG. 2.

The forward housing section 28, like the housing section 30, comprises an annular or cylindrical side wall 144 which is arranged coaxially of the steering shaft 18 and is spaced slightly radially inwardly from the inner periphery of the housing section 30. The forward end of the side wall 144 is adapted to be fixedly secured, as by welding or the like, to the outer periphery of an annular or ring-shaped end member 146 disposed circumjacent the forward shaft section 20 of the steering shaft 18. The end member 146 defines a central annular opening 148 within which the cylindrical portion 58 of the shaft section 20 extends. An annular sleeve bearing or bushing 150 is provided interjacent the rearward side of the end member 146 and the radial face or wall 56 of the shaft section 20, the bushing 150 preferably being fabricated of Delrin or a similar material which permits friction free rotation of the shaft section 20 with respect to the end member 146. The forwardmost end of the member 146 is formed with an annular recess on counterbore 152 within which a fluid tight seal 154 is disposed and retained by means of a suitable washer 156 and retaining or snap ring 158, whereby to provide a fluid tight seal at the forward end of the assembly 10. The rearward end of the housing section 28 is provided with a pair of longitudinally spaced anti-friction guides 160 and 162 which are preferably fabricated of polyethlene. As best seen in FIG. 6, the guides 160, 162 are of a generally sleeve like configuration and are dimensioned such that the outer peripheries thereof are contiguously engaged with the inner periphery of the side wall 120, whereby the guide members 160, 162 provide for longitudinal spaced support of the housing seciton 28 around the outer surface of the rearward end of the housing section 28, and by virtue of the low friction characteristics of the members 160, 162, the housing sections 28, 30 are adapted to telescope axially of one another and thus collapse concomitantly with the steering shaft 18. As best seen in FIG. 6, the guide members 160, 162 are each formed with a pair of diametrically opposed, radially inwardly extending mounting tabs or embossments, generally designated 164, which are adapted to project radially inwardly through suitable complementary shaped bores 166 in the side wall 144 of the forward housing section 28, thus positively securing the members 160, 162 on the assembly 10.

The entire steering column assembly 10 of the present invention may be mounted in one of a number of ways on the associated vehicle 12, and although the embodiment of the present invention illustrated herein is not shown as being provided with the shift tube normally attendant steering columns of modern automobiles, it will be apparent that said assembly 10 may be provided with such a tube when desired. Preferably, the rearward or upper end of the steering column assembly 10 is provided with some type of a "break-away" type bracket for supporting the assembly 10, for example, on the lower side of the vehicle instrument panel. Such a bracket may be of any suitable construction for frictionally, clampingly or otherwise supporting the upper end of the assembly 10 in a manner such that the assembly may readily collapse upon impact of the vehicle operator with the steering wheel assembly 14. Alternatively, a suitable bracket provided with shear type pins may be utilized to provide the necessary break-away feature.

One particular feature of the present invention will be seen from the fact that once the assembly 10 is collapsed, it may be reset without requiring the replacement of any component parts thereof, unlike mechanical systems heretofore known and used. Moreover, the assembly may be tested prior to installation within a vehicle in order to assure uniform operational characteristics. Still another feature of the present invention resides in the fact that the resistance of the valve assembly 46 to opening may be adjusted by merely threadably advancing or retracting the nut 90, whereby to provide for convenient control of the impact force required to effect collapsing of the assembly 10. Yet another feature of the present invention will be seen from the fact that the steering column assembly will find particularly useful application in telescopic-type steering columns of the type frequently found on modern automotive vehicles. By virtue of the extreme simple design of the steering column assembly 10 of the present invention, said assembly may be economically manufactured, easily installed and will be maintenance free.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

I claim:
1. A collapsible steering column comprising,
a steering shaft having forward and rearward shaft sections, with said rearward shaft section adapted to be operatively connected to an associated steering wheel assembly and said forward shaft section adapted to be operatively connected to an associated steering gear assembly,
means operatively connecting said forward and rearward shaft sections and defining a fluid reservoir, and
means including a non-circular cross-sectional shaped portion on said rearward shaft section and a complementary-shaped element slidably and non-rotatably engaged therewith for operatively connecting said rearward shaft section with said reservoir defining means,
valve means disposed within said reservoir and dividing the interior thereof into first and second fluid chambers,
said valve means normally being closed and being actuable to an open position in response to preselected axial movement of one of said steering shaft sections,
whereby to permit actuating fluid disposed in one of said fluid chambers to flow toward the other of said chambers and thereby dampen said axial movement of said one steering shaft section.

2. The invention as set forth in claim 1 wherein said valve means comprises a closure member and means resiliently urging said closure member to a position closing said valve means.

3. The invention as set forth in claim 1 which includes housing means extending coaxially of said steering shaft and comprising first and second telescopic sections adapted to move longitudinally of one another upon preselected axial movement of one of said steering shaft sections.

4. The invention as set forth in claim 3 which includes antifriction guide means interposed between said housing sections.

5. The invention as set forth in claim 1 wherein said fluid reservoir comprises a longitudinally extending cylindrical side wall, one end of said side wall being provided with a steering shaft guide member adapted to slidably engage one of said steering shaft sections, and the opposite end of said side wall being operatively secured to the other of said steering shaft sections.

6. The invention as set forth in claim 1 wherein said valve means is operatively supported upon one of said steering shaft sections.

7. A collapsible steering column comprising,
a steering shaft having forward and rearward shaft sections, with said rearward shaft section adapted to be operatively connected to an associated steering wheel and said forward shaft section being adapted to be operatively connected to an associated steering gear assembly,
means including a generally cylindrical enclosure member arranged coaxially of said steering shaft and defining a longitudinally extending fluid reservoir disposed between said upper and lower shaft sections,
said rearward shaft section having a non-circular cross-sectional shaped portion being longitudinally slidable and non-rotatably engaged with a complementary-shaped element on said last mentioned means,
valve means mounted on one of said shaft sections and separating the interior of said reservoir into first and second fluid chambers,
means normally closing said valve means and being actuatable to open said valve means in response to preselected axial movement of one of said steering shaft sections, whereby to permit actuating fluid disposed in one of said fluid chambers to flow into the other of said chambers and thereby dampen said axial movement of said one steering shaft section, and
housing means surrounding said steering shaft and fluid reservoir and comprising first and second telescopic housing sections adapted to move longitudinally of one another upon preselected axial movement of one of said steering shaft sections.

8. In a collapsible steering column comprising a steering shaft and a fluid reservoir adapted to dampen longitudinal movement of the shaft,
a valve assembly dividing the reservoir into first and second fluid chambers,
said valve assembly including a valve member defining at least one valve port communicating said fluid chambers,
a first closure member adapted to selectively close said port,
means resiliently urging said closure member toward a position closing said port,
means defining a fluid passage communicating said fluid chambers, and
a second closure member movable between positions opening and closing said fluid passage in response to the differential pressure conditions between said first and second fluid chambers.

9. The invention as set forth in claim 8 wherein said first closure member comprises a generally radially extending member adapted to be resiliently urged into engagement with one side of said valve member.

10. The invention as set forth in claim 9 wherein said second closure member comprises a sleeve-like element extending circumferentially around said valve member, and which includes guide means on said valve member for supporting said sleeve-like element for movement between said positions opening and closing said fluid passage.

11. The invention as set forth in claim 8 wherein said resilient means comprises a helical coil spring extending coaxially of said valve member.

12. The invention as set forth in claim 8 which includes a plurality of axially extending, circumferentially spaced fluid ports, all of which are adapted to be selectively closed by said first closure member, and wherein said passage defining means comprises at least one radially extending passage communicating one of said ports with one of said fluid chambers, and wherein said second closure member comprises a sleeve-like element extending circumferentially around said valve member and movable between positions opening and closing said fluid passage.

13. A collapsible steering column comprising,
a steering shaft having forward and rearward shaft sections with said rearward shaft section adapted to be operatively connected to an associated steering wheel and said forward shaft section being adapted to be operatively connected to an associated steering gear assembly,
means defining a longitudinally extending fluid reservoir disposed between said forward and rearward shaft sections,
said rearward shaft section being longitudinally slidable and non-rotatably engaged with said last mentioned means,
valve means mounted on one of said shaft sections and separating the interior of said reservoir into first and second fluid chambers,
means normally closing said valve means and being actuatable to open said valve means in response to preselected axial movement of one of said steering shaft sections, whereby to permit actuating fluid disposed in one of said fluid chambers to flow into the other of said chambers and thereby dampen said axial movement of said one steering shaft section,
housing means surrounding said steering shaft and fluid reservoir and comprising first and second telescopic housing sections adapted to move longitudinally of one another upon preselected axial movement of one of said steering shaft sections,
said valve means comprising a valve member defining at least one valve port communicating said fluid chambers, a first closure member adapted to selectively close said port, means resiliently urging said closure member toward a position closing said port, means defining a fluid passage communicating said fluid chambers, and a second closure member movable between positions opening and closing said fluid passage in response to the differential pressure conditions between said first and second fluid chambers.

14. A collapsible steering column comprising,
a steering shaft having forward and rearward shaft sections, with said rearward shaft section adapted to be operatively connected to an associated steering wheel and said forward shaft section being adapted to be operatively connected to an associated steering gear assembly,
means defining a longitudinally extending fluid reservoir disposed between said forward and rearward shaft sections,
said rearward shaft section being longitudinally slidable and non-rotatably engaged with said last mentioned means,
valve means mounted on one of said shaft sections and separating the interior of said reservoir into first and second fluid chambers,
means normally closing said valve means and being actuatable to open said valve means in response to preselected axial movement of one of said steering shaft sections, whereby to permit actuating fluid disposed in one of said fluid chambers to flow into the other of said chambers and thereby dampen said axial movement of said one steering shaft section,
housing means surrounding said steering shaft and fluid reservoir and comprising first and second telescopic housing sections adapted to move longitudinally of one another upon preselected axial movement of one of said steering shaft sections,
said rearward shaft section being longitudinally slidable but non-rotatably connected to said means defining said fluid reservoir.

15. A collapsible steering column comprising,
a steering shaft having forward and rearward shaft sections, with said rearward shaft section adapted to be operatively connected to an associated steering wheel and said forward shaft section being adapted to be operatively connected to an associated steering gear assembly,
means defining a longitudinally extending fluid reservoir disposed between said forward and rearward shaft sections,
said rearward shaft section being longitudinally slidable and non-rotatably engaged with said last mentioned means,
valve means mounted on one of said shaft sections and separating the interior of said reservoir into first and second fluid chambers,
means normally closing said valve means and being actuatable to open said valve means in response to preselected axial movement of one of said steering shaft sections, whereby to permit actuating fluid disposed in one of said fluid chambers to flow into the other of said chambers and thereby dampen said axial movement of said one steering shaft section,
housing means surrounding said steering shaft and fluid reservoir and comprising first and second telescopic housing sections adapted to move longitudinally of one another upon preselected axial movement of one of said steering shaft sections,
said valve means being operatively supported on the forward end of said rearward shaft section.

16. A collapsible steering column comprising,
a steering shaft having forward and rearward shaft sections, with said rearward shaft section adapted to be operatively connected to an associated steering wheel assembly and said forward shaft section adapted to be operatively connected to an associated steering gear assembly,
means operatively connecting said forward and rearward shaft sections and defining a fluid reservoir,
valve means disposed within said reservoir and dividing the interior thereof into first and second fluid chambers,
said valve means normally being closed and being actuatable to an open position in response to preselected axial movement of one of said steering shaft sections,
whereby to permit actuating fluid disposed in one of said fluid chambers to flow toward the other of said chambers and thereby dampen said axial movement of said one steering shaft section,
said valve means comprising a valve member defining at least one valve port communicating said fluid chambers, a first closure member adapted to selectively close said port, means resiliently urging said closure member toward a position closing said port, means defining a fluid passage communicating said fluid chambers and a second closure member movable between positions opening and closing said fluid passage in response to the differential pressure conditions between said first and second fluid chambers.

17. The invention as set forth in claim 16 which includes lash absorbing sleeve means interposed between said rearward shaft section and said means defining said fluid reservoir for providing friction free relative longitudinal sliding movement therebetween.

References Cited

UNITED STATES PATENTS

| 2,028,953 | 1/1936 | Roark | 74—493 |
| 3,338,347 | 8/1967 | Avner | 188—88 |
| 3,389,617 | 6/1968 | Pavlecka | 74—492 |

MILTON KAUFMAN, Primary Examiner

U.S. Cl. X.R.

188—96